219-121 SR

3/25/86 OR 4,578,560

United States Patent [19]

Tanaka et al.

[11] Patent Number: 4,578,560

[45] Date of Patent: Mar. 25, 1986

[54] HIGH FREQUENCY INDUCTION COUPLED PLASMA TORCH WITH CONCENTRIC PIPES HAVING FLANGES THEREON

[75] Inventors: Gotaro Tanaka; Kunio Fujiwara; Tetsuo Miyajiri, all of Kanagawa, Japan

[73] Assignee: Sumitomo Electric Industries, Ltd., Osaka, Japan

[21] Appl. No.: 532,937

[22] Filed: Sep. 16, 1983

[30] Foreign Application Priority Data

Sep. 17, 1982 [JP] Japan .......................... 57-139953[U]

[51] Int. Cl.[4] .............................................. B23K 9/00

[52] U.S. Cl. ....................... 219/121 PR; 219/121 PP; 219/121 PQ; 315/111.51; 356/316

[58] Field of Search .................. 219/121 PR, 121 PQ, 219/121 PP, 121 PM, 75, 76.16, 10.55 R; 313/231.31, 231.41, 231.51; 315/111.21, 111.51; 356/316

[56] References Cited

U.S. PATENT DOCUMENTS

| | | | |
|---|---|---|---|
| 3,296,410 | 1/1967 | Hedger | 219/121 PR |
| 3,467,471 | 9/1969 | Greenfield et al. | 219/121 PR |
| 3,586,905 | 6/1971 | Bignell | 219/121 PQ |
| 4,035,604 | 7/1977 | Meleka et al. | 219/121 PQ |
| 4,147,916 | 4/1979 | Fairbairn | 219/121 PT |

*Primary Examiner*—M. H. Paschall

*Attorney, Agent, or Firm*—Sughrue, Mion, Zinn, Macpeak and Seas

[57] ABSTRACT

A high frequency induction coupled plasma torch is disclosed. The torch is comprised of a multi-pipe structure and is used for forming a plasma flame by high frequency power induction. The torch is comprised of a plurality of pipes which are coaxially arranged within each other. Each of the pipes has one or more flanged openings positioned on its surface whereby it is interconnected to the adjacent pipe. By means of the flanged openings any given pipe may be interconnected with any number of outer pipes. The torch can be economically produced and maintained.

18 Claims, 4 Drawing Figures

HIGH FREQUENCY INDUCTION COUPLED PLASMA TORCH WITH CONCENTRIC PIPES HAVING FLANGES THEREON

FIELD OF THE INVENTION

The invention relates to a high frequency induction coupled plasma torch having a multi-pipe structure for forming a plasma flame by high frequency power induction. More particularly, the invention relates to such a torch having flanges formed on outer and inner pipes, respectively, which are coaxially arranged, said flanges being tightened together.

BACKGROUND OF THE INVENTION

In a high frequency induction coupled plasma (or a hot plasma), the temperature of the center of the plasma flame is considerably high, usually higher than 5000° C. Accordingly, the material of a torch forming a plasma flame must have high heat resistance and a low coefficient of thermal expansion. Thus, in general, such torches are made of quartz glass.

A conventional plasma torch is shown in FIG. 1. The plasma torch 1, is a multi-pipe torch which is formed as follows: Three cylindrical pipes 2, 3 and 4 are coaxially arranged; that is, the pipe 2 is inserted into the pipe 3, which is inserted into the pipe 4. The pipe 3 is welded to the pipe 2 at one end, and similarly the pipe 4 is welded to the pipe 3 at one end. Branch pipes 6 and 7 are extended from the pipes 3 and 4, respectively. A plasma gas and a cooling gas are introduced through the branch pipes 6 and 7, respectively. Accordingly, the inner wall of the torch 1, which contacts the plasma flame, is protected by a large quantity of cooling gas such as Ar or $O_2$ gas. The upper portion of the plasma torch is inserted into an annular high frequency induction coil 5.

The plasma torch 1 thus constructed is manufactured by welding the cylindrical pipes 2, 3 and 4 as described above; that is, the manufacture of the plasma torch 1 requires a manual processing step. In addition, since the cylindrical pipes 2, 3 and 4 are comprised of quartz glass, the manual processing step must be carried out with considerable skill under high temperature. Accordingly, it is difficult to manufacture a plasma torch 1 with a high degree of accuracy, and it is especially difficult to manufacture a plasma torch in which the circumferential clearances between the cylindrical pipes 2, 3 and 4 are uniform. Therefore, in the conventional plasma torch 1, the plasma flame may be deflected. If deflection takes place, the pipe contacting the plasma flame is deformed or evaporated.

As is apparent from the above description, the conventional plasma torch does not generally possess sufficient accuracy, particularly with respect to the accuracy of the circumferential clearances between the pipes. This can cause various difficulties.

SUMMARY OF THE INVENTION

A primary object of this invention is to provide a high frequency induction coupled plasma torch possessing a high degree of dimensional accuracy and which stably forms a plasma flame at the center of the torch.

These and other objects of the invention have been achieved by the provision of a high frequency induction plasma torch having a multi-pipe structure for forming a plasma flame by high frequency power induction, wherein the flanges are formed on the outer and inner pipes, respectively, which are coaxially arranged, the flanges being tightened together.

DETAILED DESCRIPTION OF PREFERRED EMBODIMENTS

Figure 1:
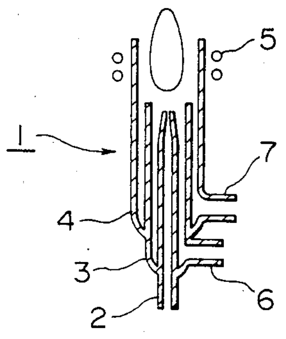
PRIOR ART FIG. 1
FIG. 1 is a cross-sectional view of a conventional high frequency induction coupled plasma torch.
Figure 2:
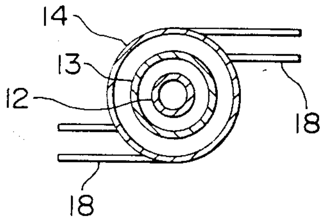
FIG. 2 is a cross-sectional view of a first embodiment of the high frequency induction coupled plasma torch of the present invention.

Examples of the high frequency induction coupled plasma torch according to the present invention will now be described in detail. A cross-sectional view of the plasma torch of the invention is shown in FIG. 2. Three cylindrical pipes 12, 13 and 14 are different in diameter and coaxially arranged. More specifically, the pipe 12 is coaxially inserted into the pipe 13, which is coaxially inserted into the pipe 14. These pipes are tightly coupled to one another through flanges formed thereon, thus forming a multi-pipe, i.e., the high frequency induction coupled plasma torch 11.

Figure 3:
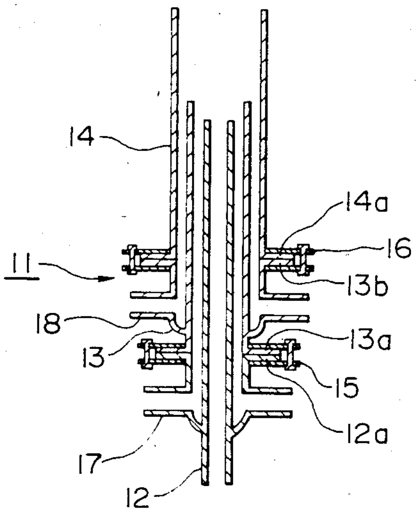
FIG. 3 is a longitudinal cross-sectional view of the first embodiment of the invention shown in FIG. 2.

The connections of the pipes can be explained in further detail by referring to FIG. 3. The base end portion of the innermost cylindrical pipe 12 is formed into a dual pipe, and an annular flange **12*a* is integrally formed on the upper end of the outer pipe of the dual pipe, while a branch pipe 17 for introducing a plasma gas is extended from the outer pipe. The flange 12*a* is tightly secured to a flange 13*a* which is formed at the base end of the cylindrical pipe 13 into which the cylindrical pipe 12 is inserted. More specifically, these flanges 12*a* and 13*a* are closely secured to each other with tightening metal parts 15**.

The base end portion of the cylindrical pipe 13 is also formed into a dual-pipe, and an annular flange **13*b* is integrally formed on the upper end of the outer pipe of the dual-pipe, while a branch pipe 18 for introducing a cooling gas is extended from the outer pipe. It is desirable that the branch pipe 18 be extended in the direction of a line tangent to the torch 11 and that the cylindrical pipes 13(12) has plural branch pipes 18(17) as shown in FIG. 3 because the cooling gas introduced through branch pipe 18 rises while rotating inside the torch, thus stabilizing the plasma. The flange 14*a* is integrally formed on the base end of the cylindrical pipe 14 which is put over the cylindrical pipe 13. The flange 14*a* is tightly mounted on the flange 13*b*. More specifically, these flanges 13*b* and 14*a* are tightened together with tightening metal parts 16**.

Thus, the high frequency induction coupled plasma torch 11 can be provided merely by tightening the flanges **12*a*, 13*a* and 14*a* of the cylindrical pipes 12, 13 and 14 together. Accordingly, the plasma torch of the present invention eliminates manufacturing difficulties accompanying the conventional plasma torch (which must be manufactured by welding the cylindrical pipes with considerable skill at high temperature). Further, since it is possible to mutually displace the flanges 12*a*, 13*a* and 14*a* or to insert spacers between these flanges, the circumferential clearances between the cylindrical pipes 12, 13 and 14** can be uniformly adjusted with high accuracy. In this connection, it is desirable to provide the flanges with fitting surfaces and to lightly apply a high-temperature-resisting grease to these fitting surfaces. This is done so that adjustment can be achieved readily and leakage of the plasma gas can be completely prevented.

The plasma torch 11 according to the present invention is economical because it can be readily assembled or disassembled. Further, individual defective components can be replaced while continuing to use the remaining components. For instance, foreign matter or reactants which are grown in the plasma flame by introducing some source gases are deposited on the inner walls of the plasma torch 11, especially on the outermost inner wall. This can make it difficult to form a plasma flame. If this takes place, only the components on which the foreign matter has been deposited need be replaced. This is more economical than complete replacement of the torch 11.

Figure 4:
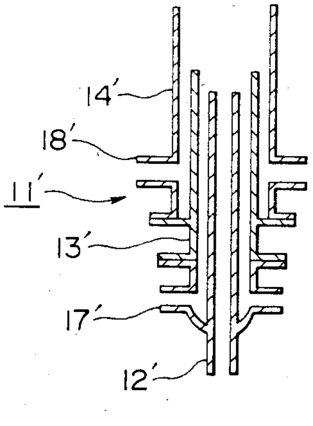
FIG. 4 is a longitudinal cross-sectional view of a second embodiment of the high frequency induction coupled plasma torch of the present invention.

A second embodiment of the plasma torch of the present invention is shown in FIG. 4. In the plasma torch 11' in FIG. 4, gas introducing branch pipes 17' and 18' are extended from the intermost cylindrical pipe 12' and the outermost cylindrical pipe 14', respectively. The other structure is substantially the same as that of the first embodiment shown in FIG. 2.

The high frequency induction coupled plasma torch of the present invention can be constructed so that the size of the opening can be very accurately controlled. Accordingly, the plasma flame can be formed stably at the center of the torch. Therefore, the possibility of thermally deteriorating the torch is considerably decreased.

While the present invention has been described with reference to specific embodiments, it should be noted that the scope of the invention is not limited thereto or thereby. For example, the present invention can be applied to a plasma torch which is in the form of two pipes coaxially arranged, or to more than three pipes coaxially arranged.

What is claimed is:

1. A high frequency induction coupled plasma torch employing a concentric pipe assembly passing plasma gas therethrough and generating a plasma flame at one end of said pipe assembly, said pipe assembly comprising, at least first and second cylindrical pipes;

said first pipe comprising an elongated cylindrical portion and an outer portion extending from said elongated cylindrical poriton near a base of said first cylindrical pipe, said outer portion terminating in a flanged opening having a flange surrounding but not in contact with said first cylindrical pipe;

said second pipe comprising an elongated cylindrical portion terminating in an outward bottom flange at the end opposite the end at which a flame is generated;

the elongated cylindrical portion of said first pipe being inside and coaxial with the elongated cylindrical portion of said second pipe, and said flange of said first pipe mating and being fastened to said outward bottom flange of said second pipe; and clamping means for fastening together said flange of said first pipe and said outward bottom flange of said second pipe, said clamping means permitting adjustment of the relative positions of said first and second pipes.

2. A high frequency induction coupled plasma torch as claimed in claim 1, wherein said outer portion of said first pipe has openings therein for receiving a plasma gas, whereby the plasma gas flows between the elongated cylindrical portions of said first and second pipes.

3. A high frequency induction coupled plasma torch as claimed in claim 1, said clamping means permitting separation of said first and second pipes.

4. A high frequency induction coupled plasma torch as claimed in claim 1, said flange of said first pipe and said outward bottom flange of said second pipe being provided with fitting surfaces for receiving a grease-like substance, whereby plasma gas leakage is substantially completely prevented.

5. A high frequency induction coupled plasma torch as claimed in claim 2, wherein said second pipe further comprises an outer portion extending from said cylindrical portion at a point above said bottom flange, said outer portion terminating in a flanged opening having an upper flange surrounding but not in contact with said cylindrical portion;

said torch further comprising a third pipe comprising an elongated cylindrical portion terminating in an outward bottom flange at the base thereof;

the elongated cylindrical portion of said second pipe being inside and coaxial with the elongated cylindrical portion of said third pipe, and said upper flange of said second pipe mating and being fastened to said outward bottom flange of said third pipe.

6. A high frequency induction coupled plasma torch as claimed in claim 5, said clamping means permitting separation of said first and second pipes.

7. A high frequency induction coupled plasma torch as claimed in claim 5, wherein said outer portion of said second pipe has openings therein for receiving a cooling gas, whereby the cooling gas flows between the elongated cylindrical portions of said second and third pipes.

8. A high frequency induction coupled plasma torch as claimed in claim 7, wherein said openings for said plasma and cooling gases have branch pipes connected thereto, said branch pipes being tangentially positioned relative to said elongated cylindrical portions.

9. A high frequency induction coupled plasma torch as claimed in claim 7, wherein the pipes are comprised of quartz glass.

10. A high frequency induction coupled plasma torch as claimed in claim 2, wherein said second pipe further comprises an upper flange extending from the outer surface of said cylindrical portion at a position above said bottom flange;

said torch further comprising a third pipe comprising an elongated cylindrical portion terminating in an outward bottom flange at the base thereof;

the elongated cylindrical portion of said second pipe being inside and coaxial with the elongated cylindrical portion of said third pipe, and said upper flange of said second pipe mating and being fastened to said bottom flange of said third pipe.

11. A high frequency induction coupled plasma torch as claimed in claim 10, wherein said third pipe has openings therein for receiving a cooling gas, whereby the cooling gas flows between the elongated cylindrical portions of said second and third pipes.

12. A high frequency induction coupled plasma torch as claimed in claim 11, wherein said openings for said plasma and cooling gases have branch pipes connected thereto, said branch pipes being tangentially positioned relative to said elongated cylindrical portions.

13. A high frequency induction coupled plasma torch as claimed in claim 11, wherein the pipes are comprised of quartz glass.

14. A high frequency induction coupled plasma torch as claimed in claim 6, further comprising second clamping means for fastening together said upper flange of said second pipe and said outward bottom flange of said third pipe, said second clamping means permitting adjustment of the relative positions of said second and third pipes.

15. A high frequency induction coupled plasma torch as claimed in claim 14, said second clamping means permitting separation of said second and third pipes.

16. A high frequency induction coupled plasma torch as claimed in claim 10, said clamping means permitting separation of said first and second pipes.

17. A high frequency induction coupled plasma torch as claimed in claim 16, further comprising second clamping means for fastening together said upper flange of said second pipe with said outward bottom flange of said third pipe, said second clamping means permitting adjustment of the relative positions of said second and third pipes.

18. A high frequency induction coupled plasma torch as claimed in claim 17, said second clamping means permitting the separation of said second and third pipes.

* * * * *